United States Patent [19]

Sakai

[11] Patent Number: 5,190,818
[45] Date of Patent: Mar. 2, 1993

[54] ADHESIVE COMPOSITION FOR TEMPORARY ADHESIVE BONDING OF PAPER SHEETS

[75] Inventor: Tsutomu Sakai, Tokyo, Japan

[73] Assignee: Toppan Moore Co., Ltd., Tokyo, Japan

[21] Appl. No.: 672,838

[22] Filed: Mar. 21, 1991

[30] Foreign Application Priority Data

Apr. 20, 1990 [JP] Japan ................................. 2-103140
Jun. 29, 1990 [JP] Japan ................................. 2-170100

[51] Int. Cl.$^5$ ........................... B32B 7/12; C08L 3/00
[52] U.S. Cl. .................................. 428/355; 428/356; 428/496; 428/511; 428/512; 524/47; 524/492
[58] Field of Search .................. 428/356, 355; 524/47, 524/492

[56] References Cited

U.S. PATENT DOCUMENTS

| | | | |
|---|---|---|---|
| 3,692,713 | 9/1972 | Columbus et al. | 524/47 |
| 4,471,082 | 9/1984 | Kwok et al. | 524/47 X |
| 4,505,976 | 3/1985 | Doehnert et al. | 428/355 |
| 4,568,714 | 2/1986 | Overholt | 524/47 X |
| 4,576,854 | 3/1986 | Kurahashi | 428/356 X |
| 4,673,698 | 6/1987 | Krankkala | 524/47 |

FOREIGN PATENT DOCUMENTS 62-158770 12/1985 Japan .
62-158771 12/1985 Japan .
62-158772 12/1985 Japan .
62-158773 12/1985 Japan .

Primary Examiner—George F. Lesmes
Assistant Examiner—D. R. Zirker
Attorney, Agent, or Firm—Wyatt, Gerber, Burke and Badie

[57] ABSTRACT

The adhesive composition of the invention exhibits an adequately controlled adhesive bonding strength when paper sheets coated therewith are bonded together to be adaptable to subsequent separation of the bonded sheets of paper by peeling. The essential ingredients of the adhesive composition include: (a) a rubber latex; (b) a silica gel powder having a specified average particle diameter; and (c) a starch, preferably, having a specified particle diameter, e.g. wheat starch, each in a specified weight proportion. In addition to the good balance between the reliability of the adhesive bonding and subsequent peelability, the paper sheet coated with the adhesive composition is prevented from a decrease in the adhesiveness even when the surface is contaminated with a silicone oil and from the troubles due to blocking when adhesive-coated sheets are stacked one on the other with the adhesive-coated surfaces in direct contact with each other.

9 Claims, No Drawings

ADHESIVE COMPOSITION FOR TEMPORARY ADHESIVE BONDING OF PAPER SHEETS

BACKGROUND OF THE INVENTION

The present invention relates to a novel adhesive composition for temporary adhesive bonding of paper sheets or, more particularly, the invention relates to an adhesive composition capable of adhesively bonding sheets of paper and the like with such an adequate adhesive bonding strength by pressing without heating of the adhesive layer that the once adhesively bonded sheets can be separated by peeling without exhibiting an excessively high peeling resistance.

Along with the revolutionary progress in the information-transmission systems, the paper-based information-transmission system, such as mailing of printed matters, is also experiencing an outgrow from its traditional style. For example, foldable postcards as a system have already been taken into the acceptable mailing system under the postal law in several countries. In this system, a sheet of paper having a size substantially larger than the regular postcard specified by the postal regulations is printed on the surface and then folded in two or in three by the sender of the mail with an object to reduce the sheet size to be the regular postcard size and to keep the printed information in confidence while the areas on the sheet which come into contact with each other by folding are coated with a special adhesive so that, when the sheet Is folded and pressed, the flaps of the folded sheet coming into contact with each other can be adhesively bonded to each other temporarily enabling the foldable postcard to be handled in just the same way of mailing as ordinary postcards and keeping the printed information in confidence. The receiver of the thus folded postcard separates the adhesively bonded flaps by peeling into the unfolded sheet so that the printed information on the theretofore concealed areas by bonding of the flaps is now readable. Similar foldable sheets of paper are now acquiring prevailing use for recording and transmitting computerized information printed out by using various types of printer machines.

As is understood from the above given description of the foldable postcard system, the performance of the system heavily depends on the properties of the adhesive with which the foldable postcard is coated on some areas in order that reliable adhesive bonding can be obtained between the flaps of the folded sheet at least while the postcard is on the mailing route but the bonded flaps can be readily opened by the receiver by peeling without an excessively high peeling resistance eventually to cause rupture of the paper sheet per se. Namely, the adhesive used in this application, referred to as a peelable adhesive hereinbelow, must give reliable but temporary adhesion between sheets of paper. It is known empirically that the peeling resistance of paper sheets coated with a peelable adhesive composition and bonded together by pressing should be in the range from 30 to 120 g or, preferably, from 60 to 80 g per 25 mm width although the exact optimum peeling resistance may depend on the quality of the paper.

Moreover, the surface of a paper sheet coated with a peelable adhesive composition is sometimes contaminated with a silicone oil in the printing process, in particular, using a non-impact printer. As is well known, silicone oils usually give strong surface releasability to the surface coated or contaminated therewith so that a sheet coated with a peelable adhesive no longer can exhibit reliable adhesion when the surface is contaminated with a silicone oil.

It is also important that the surface of the sheet coated with the peelable adhesive is free from the troubles caused by the phenomenon of so-called blocking which means that, when adhesive-coated surfaces are kept in contact with each other, the surfaces spontaneously become bonded together even without intentional application of a compressive force to effect bonding by means of the pressure-sensitive adhesive.

Thus, a peelable adhesive must satisfy the two contradictory requirements for the reliability of adhesive bonding and peelability to ensure safe opening of the folded sheet by the receiver or reader of the information. Various types of peelable adhesives have been proposed in the prior art with an object to control or limit the adhesive bonding strength of the adhesive composition using a pressure-sensitive, heat-sensitive or remoistening adhesive as the base adhesive, of which pressure-sensitive adhesives belong to the only practically promising class as compared with the other types.

A conventional way to control the adhesive bonding strength of a pressure-sensitive adhesive is to compound the adhesive with a substantial amount of a fine solid particulate material although no practically satisfactory peelable adhesive compositions have yet been obtained by this means. For example, Japanese patent Kokai 62-158770, -58771, -158772 and -158773 disclose pressure-sensitive adhesive compositions comprising 100 parts by weight as solid of an emulsion of a synthetic rubber such as SBR, NBR and polychloroprene rubber, optionary, in combination with a tackifier and 5 to 40 parts by weight of a fine silica gel powder. These adhesive compositions, however, are not suitable for use as a peelable adhesive since no good balance can be obtained therewith between reliability in adhesive bonding and subsequent peelability.

SUMMARY OF THE INVENTION

The present invention accordingly has an object to provide a novel and improved peelable adhesive composition capable of giving adhesive-coated paper sheets which can be temporarily but reliably bonded together by pressing leaving subsequent peelability with an adequate peeling resistance and are free from the troubles due to the adhesion-inhibiting effect by contamination with a silicone oil and due to the phenomenon of blocking. The invention also has an object to provide a sheet of paper coated with such a peelable adhesive composition.

Thus, the peelable adhesive composition of the present invention comprises, as a mixture:

(a) 100 parts by weight as solid of an aqueous emulsion or latex of rubber;

(b) from 30 to 150 parts by weight of particles of silica gel having an average particle diameter in the range from 10 nm to 30 μm; and (c) from 70 to 250 parts by weight of starch, the total amount of the components (b) and (c) being in the range from 100 to 400 parts by weight.

The starch particles should preferably have an average particle diameter in the range from 5 to 25 μm and the particle diameter of the starch particles should preferably be larger than that of the silica gel particles. In this regard, most satisfactory results can be obtained by using wheat starch as the component (c).

DETAILED DESCRIPTION OF THE PREFERRED EMBODIMENTS

As is described above, the essential ingredients in the inventive peelable adhesive composition include (a) a rubber emulsion or latex, (b) a silica gel powder and (c) a starch each in a specified amount although it is optional that the adhesive composition is further admixed with various kinds of known additives such as tackifiers and the like.

The rubber in the form of an aqueous emulsion or latex as the component (a) is not particularly limitative including natural rubber, SBR, NBR, polychloroprene rubber and the like conventionally used as a base constituent of pressure-sensitive adhesives. It is preferable, however, that the rubber is a natural rubber modified by the graft polymerization of styrene and methyl methacrylate in respect of the resistance against blocking, heat and abrasion of the adhesive-coated surface. The contents of the styrene moiety and methyl methacrylate moiety in the graft-modified natural rubber should preferably be in the range from 2 to 10% by weight and from 10 to 40% by weight, respectively, based on the natural rubber calculated as solid in the latex. The aqueous emulsion or latex containing from 40 to 60% by weight of these rubbers are commercially available and can be used as such or after modification by the graft polymerization as the component (a) in the inventive peelable adhesive composition.

The component (b) in the inventive adhesive composition is a silica gel powder which should have an average particle diameter in the range from 10 nm to 30 $\mu$m or, preferably, from 1 $\mu$m to 20 $\mu$m or, more preferably, from 1 $\mu$m to 5 $\mu$m. So-called fumed and precipitated silica fillers such as those commercially available under the tradenames of Aerosil and the like can also be used as the component (b) with an object to improve the abrasion resistance of the adhesive layer provided on a paper sheet although the particles thereof are sometimes too fine to be used alone.

Another important characteristic parameter of the silica gel powder as the component (b) is the amount of oil absorption which can be determined, for example, according to the testing procedure specified in JIS K 5101. This parameter is particularly important in order to mitigate the adverse influences caused by the contamination of the adhesive-coated surface with a silicone oil presumably because the silica gel particles serve to absorb the silicone oil which otherwise causes a heavy decrease in the adhesiveness of the surface. In this regard, the silica gel powder as the component (b) should have an oil absorption of at least 100 ml/100 g or, preferably, from 200 to 300 ml/100 g.

The amount of the silica gel powder as the component (b) in the inventive adhesive composition should be in the range from 30 to 150 parts by weight or, preferably, from 50 to 100 parts by weight per 100 parts by weight of the rubber latex or emulsion calculated as solid. When the amount of the silica gel powder is too small, the adhesive bonding strength between the bonded surfaces would be too high to have the bonded sheets readily peeled off subsequently in addition to the problem due to the deficiency in the capacity of oil absorption to prevent the adverse effect caused by the contamination with a silicone oil. When the amount thereof is too large, on the other hand, the adhesive bonding strength would be too low so that the reliability of adhesive bonding is lost to cause eventual spontaneous separation of the once bonded sheets.

The third of the essential ingredients, i.e. component (c), in the inventive adhesive composition is a starch. Needless to say, starch is a natural product obtained from various kinds of plants and the properties of starches including not only the particle diameter but also morphology of particles depend on the kind of the plant from which the starch is obtained. Namely, some of starch particles may be coarse or fine and may be angular or spherical. Reportedly, the average particle diameters of starches of various origins are about 30 $\mu$m in potato starch, 15 $\mu$m in corn starch, 10 $\mu$m in wheat starch, 20 $\mu$m in tapioca starch and 15 $\mu$m in waxy corn starch. Although it is presumable that the performance of a starch powder as the component (c) in the inventive adhesive composition depends on various parameters other than the average particle diameter and the morphology of particles, the average particle diameter is the most important parameter according to the results of the detailed experiments conducted by the inventor. Namely, the starch powder as the component (c) should have an average particle diameter in the range from 5 $\mu$m to 25 $\mu$m or, preferably, from 8 $\mu$m to 20 $\mu$m. In this regard, starches of corn, wheat, tapioca and the like can be used as the component (c) with less Preference of Potato starch, of which most satisfactory results can be obtained with wheat starch although the exact reason therefor is not well understood. At least, use of a starch of an excessively large average particle diameter is undesirable because the minimum thickness of the adhesive coating layer must be equal to or larger than the largest particle diameter of the starch particles necessitating a correspondingly large coating amount.

Importantly, it was discovered that quite satisfactory results could be obtained when the starch particles as the component (c) had an average particle diameter substantially larger than that of the silica gel particles as the component (b). Although the reason therefor is also not well understood, it is presumable that, when the particle diameter of the starch is substantially larger than that of the silica gel particles, the minimum thickness of the adhesive layer formed on the surface of a sheet is limited by the diameter of the coarser starch particles while the finer silica gel particles may sink in the adhesive layer between the starch particles not to appear on the surface of the adhesive layer so that the possible adverse influences caused by the silicone oil absorbed by and retained on the surface of the silica gel particles could be further reduced The amount of the starch as the component (c) in the inventive adhesive composition should be in the range from 70 to 250 parts by weight or, preferably, from 70 to 200 parts by weight or, more preferably, from 120 to 200 parts by weight per 100 parts by weight of the rubber emulsion or latex as the component (a) calculated as solid provided that the total amount of the silica gel powder as the component (b) and the starch as the component (c) is in the range from 100 to 400 parts by weight or, preferably, from 170 to 300 parts by weight per 100 parts by weight of the rubber emulsion or latex as the component (a) calculated as solid in view of the balance between the reliability in the adhesive bonding and subsequent peelability. When the total amount of these particulate constituents, i.e. components (b) and (c), in the adhesive composition is too large, the consistency of the composition would be too high to be evenly applied on to the surface of a paper sheet. When the total amount thereof is too small, on the other hand, the adhesive bonding strength obtained by using the adhesive composition would be too high so that difficulties are encountered in separating the once adhesively bonded sheets of paper by subsequent peeling.

The peelable adhesive composition of the present invention comprising the above described essential components (a), (b) and (c) can be prepared by merely and uniformly blending the components each in a specified amount according to a conventional procedure. It is of course optional that the thus prepared inventive adhesive composition is further admixed with various known additives including tackifiers such as terpene resins and the like each in a limited amount.

The peelable adhesive composition of the invention prepared as described above can be applied to at least one surface of a paper sheet of various grades by using a conventional coating machine followed by drying with heating so that an adhesive-coated paper sheet suitable for temporary adhesive bonding can be obtained. The coating amount is usually in the range from 2 to 12 g/m$^2$ or, preferably, from 4 to 8 g/m$^2$ calculated as dry. The thus adhesive-coated paper sheets can be bonded together reliably but in a subsequently peelable fashion when they are laid one on the other with the adhesive-coated surfaces in direct contact with each other and pressed under an appropriate pressure of, for example, at least 20 kg/cm$^2$ at room temperature.

In the following, the peelable adhesive composition of the present invention and performance of paper sheets coated therewith are illustrated in more detail by way of examples and comparative examples. The adhesive-coated paper sheets as the test sample were prepared by coating a sheet of woodfree paper having a basis weight of 70 g/m$^2$ on one surface with the adhesive composition using a wire-bar coater in a coating amount of 5 g/m$^2$ as solid followed by drying for 1 minute at 100° C. and evaluated for the following items in the respectively described testing procedures.

Test I. Adhesive bonding strength

Two adhesive-coated test sheets were heated for 2 seconds at 180° C. and, after cooling, they were laid one on the other with the adhesive-coated surfaces in direct contact with each other and press-bonded by pressing in a dry sealer under a compressive force of 50 kg/cm$^2$ at room temperature. The thus adhesively bonded paper sheets were conditioned by keeping for 30 minutes in an atmosphere of 65% relative humidity at room temperature and then subjected to the determination of the Peeling resistance using an automatic tensile tester (Model Autograph AGS 50, manufactured by Shimadzu Seisakusho Co.) by pulling in a 90° direction at a pulling velocity of 30 cm/minute at 20° C.

The results of this peeling-resistance test were given in g per 25 mm width of the test sample. The results were evaluated to be excellent when the peeling resistance was from 60 to 80 g/25 mm, good when the peeling resistance was from 30 to 60 g/25 mm or from 80 to 120 g/25 mm, fair when the peeling resistance was from 15 to 30 g/25 mm or from 120 to 180 g/25 mm and poor when the peeling resistance was smaller than 15 g/25 mm or larger than 180 g/25 mm.

Test II. Adhesive bonding strength after contamination with silicone oil

Two adhesive-coated test sheets after heating for 2 seconds at 180° C. and cooling in the same manner as in Test I were each coated with a dimethyl silicone oil in a coating amount of 0.5 g/m$^2$ using a printability testing machine and then adhesively bonded together also in the same manner as in Test I excepting an increase of the pressure in the dry sealer to 100 kg/cm$^2$.

Thereafter, the thus adhesively bonded sheets were subjected to the determination of the peeling resistance in the same manner as in Test I and evaluated according to the same criteria as above.

Test III. Resistance against blocking

Two adhesive-coated test sheets as prepared were laid one on the other with the adhesive-coated surfaces in direct contact with each other and kept standing for 30 minutes at 50° C. under a load of 500 g/cm$^2$ followed by the determination of the peeling resistance in the same manner as above. The test sample was evaluated as satisfactory relative to the resistance against blocking when the peeling resistance determined in the above described manner did not exceed 10 g/25 mm or, desirably, 5 g/25 mm.

Test IV. Abrasion resistance at elevated temperature

The test was performed according to the procedure specified in JIS P 8136 at a temperature of 150° C. by rubbing with a metal probe under a load of 200 to 500 g/cm$^2$. The test sample was evaluated as satisfactory when no changes were found on the surface of the adhesive layer after 20 times of rubbing in the above described manner. When certain defects were found on the surface of the adhesive layer after rubbing in a number of times smaller than 20, the number of times of rubbing, after which certain defects were first found, was recorded.

EXAMPLE 1

A graft-modified natural rubber latex was prepared by conducting emulsion polymerization of 4 parts by weight of styrene and 16 parts by weight of methyl methacrylate in a natural rubber latex in an amount of 100 parts by weight calculated as solid. This rubber latex was admixed with an aqueous emulsion of a terpene resin as a tackifier in an amount of 5 parts by weight as solid to give a base adhesive in the form of an aqueous emulsion, of which the solid content was adjusted to 50% by weight.

Into 100 parts by weight as solid of this base adhesive were added 50 parts by weight of a silica gel powder having an average particle diameter of about 4 μm and an oil absorption of 240 ml/100 g and 150 parts by weight of wheat starch having an average Particle diameter of about 15 μm to prepare a peelable adhesive composition.

The results of the evaluation tests of the thus prepared peelable adhesive composition are shown in Table 1.

EXAMPLE 2

The experimental procedure was just the same as in Example 1 described above except that the amount of the wheat starch was increased to 250 parts by weight.

The results of the evaluation tests of the thus prepared peelable adhesive composition are also shown in Table 1.

EXAMPLE 3

The experimental procedure was just the same as in Example 1 described above except that the amounts of the silica gel powder and wheat starch were increased to 100 parts by weight and 200 parts by weight, respectively.

The results of the evaluation tests of the thus prepared peelable adhesive composition are also shown in Table 1.

EXAMPLE 4

The experimental procedure was just the same as in Example 1 described above except that the amounts of the styrene and methyl methacrylate used in the graft-polymerization for the modification of the natural rubber latex were increased to 8 parts by weight and 25 parts by weight, respectively.

The results of the evaluation tests of the thus prepared peelable adhesive composition are also shown in Table 1.

EXAMPLE 5

The experimental procedure was just the same as in Example 4 described above except that the amount of the wheat starch was increased to 250 parts by weight.

The results of the evaluation tests of the thus prepared peelable adhesive composition are also shown in Table 1.

EXAMPLE 6

The experimental procedure was just the same as in Example 4 described above except that the amounts of the silica gel powder and wheat starch were increased to 100 parts by weight and 200 parts by weight, respectively.

The results of the evaluation tests of the thus prepared peelable adhesive composition are also shown in Table 1.

COMPARATIVE EXAMPLE 1

The experimental procedure was just the same as in Example 1 described above except that the amounts of the silica gel powder and wheat starch were decreased to 30 parts by weight and 60 parts by weight, respectively.

The results of the evaluation tests of the thus prepared peelable adhesive composition are also shown in Table 1.

COMPARATIVE EXAMPLE 2

The experimental procedure was just the same as in Example 1 described above except that the amount of the silica gel powder was increased to 60 parts by weight and the amount of the wheat starch was decreased to 30 parts by weight.

The results of the evaluation tests of the thus prepared peelable adhesive composition are also shown in Table 1.

COMPARATIVE EXAMPLE 3

The experimental procedure was just the same as in Example 1 described above except that the amounts of the silica gel powder and wheat starch were increased to 200 parts by weight and 250 parts by weight, respectively.

The results of the evaluation tests of the thus prepared peelable adhesive composition are also shown in Table 1.

EXAMPLE 7

The experimental procedure was substantially the same as in Example 1 described above except that the base adhesive was prepared by admixing 100 parts by weight as solid of an aliphatic petroleum-based hydrocarbon resin in the form of an aqueous emulsion containing 46% by weight of solid (Nopco B-1, a product by Sun Nopco Co.) as a tackifier with 100 parts by weight as solid of an NBR latex of 40% nitrile ratio containing 41% by weight of solid (NiPol 516, a product by Nippon Zeon Co.).

The results of the evaluation tests of the thus prepared peelable adhesive composition are also shown in Table 1.

EXAMPLE 8

The experimental procedure was substantially the same as in Example 7 described above except that the NBR latex was replaced with the same amount as solid of an SBR latex of 55% styrene ratio containing 41% by weight of solid (Nipol LX 204, a product by Nippon Zeon Co.).

The results of the evaluation tests of the thus prepared peelable adhesive composition are also shown in Table 1.

EXAMPLE 9

The experimental procedure was substantially the same as in Example 7 described above except that the NBR latex was replaced with the same amount as solid of a polychloroprene rubber latex containing 50% by weight of solid (Denka Chloroprene LA-50, a product by Denki Kagaku Kogyo Co.).

The results of the evaluation tests of the thus prepared peelable adhesive composition are also shown in Table 1.

EXAMPLE 10

The experimental procedure was substantially the same as in Example 1 described above except that the wheat starch was replaced with the same amount of potato starch having an average particle diameter of about 30 μm.

The results of the evaluation tests of the thus prepared peelable adhesive composition are also shown in Table 1.

EXAMPLE 11

The experimental procedure was substantially the same as in Example 10 described above except that the amount of the potato starch was increased to 250 parts by weight.

The results of the evaluation tests of the thus prepared peelable adhesive composition are also shown in Table 1.

EXAMPLE 12

The experimental procedure was substantially the same as in Example 10 described above except that the amounts of the silica gel Powder and the Potato starch were increased to 100 parts by weight and 200 parts by weight, respectively.

The results of the evaluation tests of the thus prepared peelable adhesive composition are also shown in Table 1.

EXAMPLE 13

The experimental procedure was substantially the same as in Example 1 described above except that the silica gel powder having an average particle diameter of 4 μm was replaced with the same amount of another silica gel powder having an average particle diameter of about 10 μm and an oil absorption of 220 ml/100 g and the wheat starch was replaced with the same amount of tapioca starch having an average particle diameter of about 20 μm.

The results of the evaluation tests of the thus prepared peelable adhesive composition are also shown in Table 1.

EXAMPLE 14

The experimental procedure was substantially the same as in Example 13 described above except that the amount of the tapioca starch was increased to 250 parts by weight.

The results of the evaluation tests of the thus prepared peelable adhesive composition are also shown in Table 1.

EXAMPLE 15

The experimental procedure was substantially the same as in Example 13 described above except that the amounts of the silica gel powder and the tapioca starch were increased to 100 parts by weight and 200 parts by weight, respectively.

The results of the evaluation tests of the thus prepared peelable adhesive composition are also shown in Table 1.

COMPARATIVE EXAMPLE 4

The experimental procedure was substantially the same as in Example 1 described above except that the silica gel powder having an average particle diameter of 4 μm was replaced with the same amount of another silica gel powder having an average particle diameter of about 10 μm and an oil absorption of 220 ml/100 g and 150 parts by weight of the wheat starch having an average particle diameter of 15 μm was replaced with the sane amount of another wheat starch having an average particle diameter of 4 μm.

The results of the evaluation tests of the thus prepared peelable adhesive composition are also shown in Table 1.

COMPARATIVE EXAMPLE 5

The experimental Procedure was substantially the same as in Comparative Example 4 described above except that the amount of the wheat starch was decreased to 50 parts by weight.

The results of the evaluation tests of the thus prepared peelable adhesive composition are also shown in Table 1.

COMPARATIVE EXAMPLE 6

The experimental procedure was substantially the same as in Comparative Example 4 described above except that the amount of the silica gel powder was increased to 100 parts by weight and the amount of the wheat starch was decreased to 20 parts by weight.

The results of the evaluation tests of the thus prepared peelable adhesive composition are also shown in Table 1.

TABLE 1

|  | Test I g/25 mm | Test II g/25 mm | Test III g/25 mm | Test IV times of rubbing |
|---|---|---|---|---|
| Example | | | | |
| 1 | 80 | 75 | 5.0 | >20 |
| 2 | 70 | 65 | 2.0 | >20 |
| 3 | 60 | 70 | 1.5 | >20 |
| 4 | 75 | 70 | 4.0 | >20 |
| 5 | 65 | 60 | 1.5 | >20 |
| 6 | 60 | 70 | 1.0 | >20 |
| 7 | 60 | 45 | 8.0 | >20 |
| 8 | 60 | 45 | 8.5 | >20 |
| 9 | 70 | 60 | 10.0 | >20 |
| 10 | 40 | 30 | 1.0 | 15 |
| 11 | 30 | 20 | 0.5 | 15 |
| 12 | 30 | 15 | 0 | 10 |
| 13 | 100 | 80 | 5.0 | >20 |
| 14 | 80 | 70 | 2.0 | >20 |
| 15 | 70 | 70 | 1.5 | >20 |
| Comparative Example | | | | |
| 1 | >250 | 200 | 40 | >20 |
| 2 | >250 | >250 | 30 | >20 |
| 3 | 10 | 5 | 0 | 10 |
| 4 | 20 | 10 | 15 | >20 |
| 5 | 60 | 50 | 40 | >20 |
| 6 | 50 | 55 | 35 | >20 |

What is claimed is:

1. A peelable adhesive composition which comprises, as a mixture:
   (a) an aqueous emulsion or latex of a rubber containing 100 parts by weight solids:
   (b) from 30 to 150 parts by weight of particles of silica gel having an average particle diameter in the range from 10 nm to 30 μm and an oil absorption of at least 100 ml/100 g.; and
   (c) from 70 to 250 parts by weight of starch having a particle diameter larger than the average particle diameter of the silica gel particles as the component (b), the total amount of the comPonents (b) and (c) being in the range from 100to 400 parts by weight.

2. The adhesive composition as claimed in claim 1 in which the particles of the starch have an average particle diameter in the range from 5 to 25 μm.

3. The adhesive composition as claimed in claim 1 in which the particles of silica gel have an average particle diameter in the range from 1 μm to 20 μm.

4. The adhesive composition as claimed in claim 2 in which the starch is wheat starch.

5. The adhesive composition as claimed in claim 1 in which the rubber is a natural rubber modified by the graft polymerization of styrene and methyl methacrylate.

6. The adhesive composition as claimed in claim 5 in which the natural rubber modified by the graft polymerization of styrene and methyl methacrylate contains from 2 to 10% by weight and from 10 to 40% by weight of the styrene moiety and methyl methacrylate moiety, respectively, based on the moiety of natural rubber.

7. The adhesive composition as claimed in claim 1 in which the silica gel has an oil absorption ranging from 200 ml/100 g. to 300 ml/100 g.

8. A peelable adhesive-coated paper sheet for temporary adhesive bonding which is a sheet of paper coated on at least one surface with an adhesive composition which comprises, as a mixture:
   (a) an aqueous emulsion or latex of a rubber containing 100 parts by weight solids;

(b) from 30 to 150 parts by weight of particles of silica gel having an average particle diameter in the range from 10 nm to 30 μm and an oil absorption of at least 100 ml/100 g.; and (c) from 70 to 250 parts by weight of starch having a particle diameter larger than the average particle diameter of the silica gel particles as the component (b), the total amount of components (b) and (c) being in the range from 100 to 400 parts by weight.

9. The adhesive-coated paper sheet for temporary adhesive bonding as claimed in claim 8 in which the coating amount of the adhesive composition is in the range from 2 to 12 g/m² as dry.

* * * * *